Jan. 23, 1968  O. K. KRAUS  3,364,530
SWALLOW TAIL FLEXIBLE FASTENER
Filed June 8, 1966
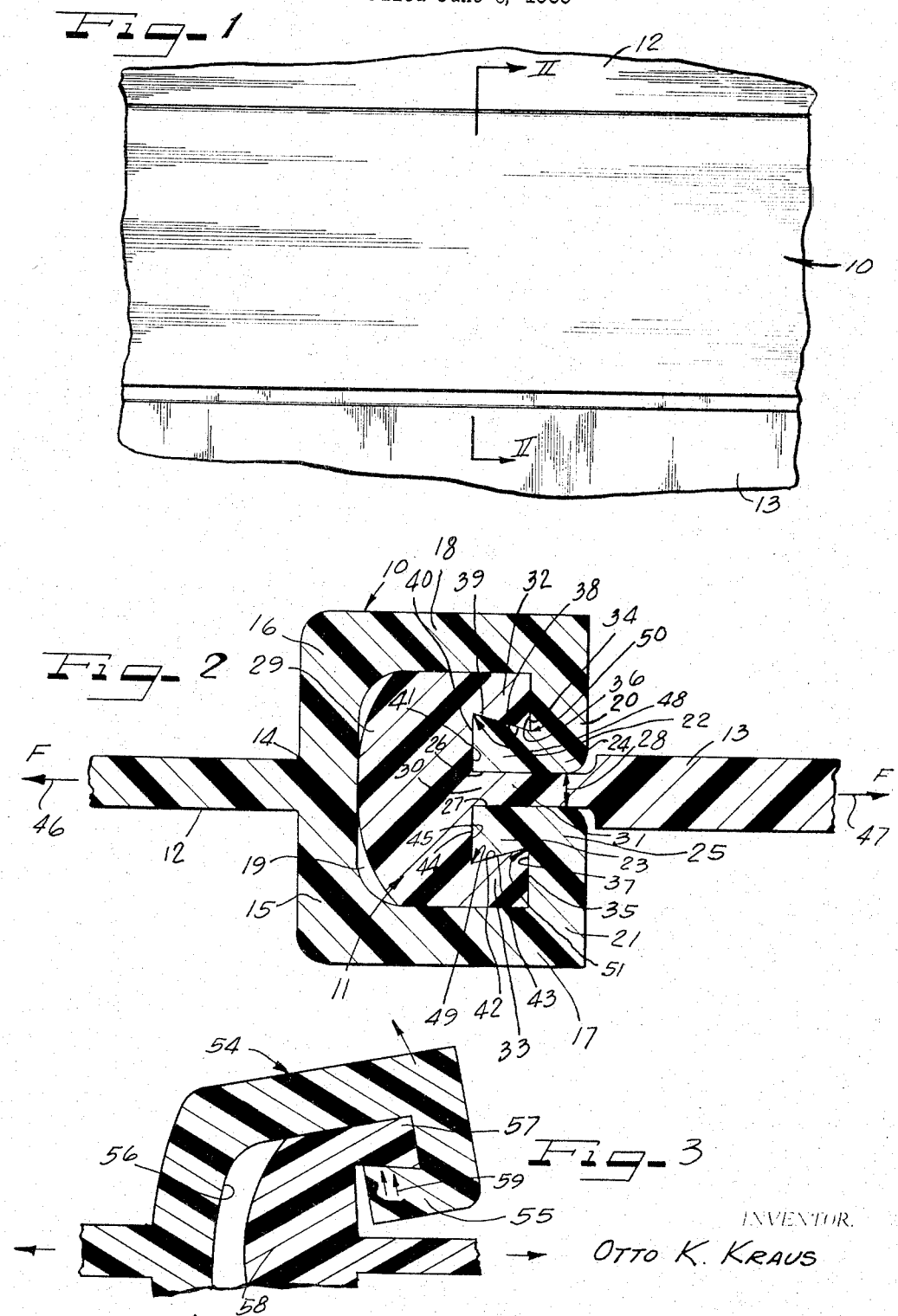
INVENTOR.
Otto K. Kraus
BY Hill, Sherman, Meroni, Gross & Simpson
ATTORNEYS

United States Patent Office 3,364,530
Patented Jan. 23, 1968

3,364,530
SWALLOW TAIL FLEXIBLE FASTENER
Otto Karl Kraus, Fort Lee, N.J., assignor to Flexigrip, Inc., Orangeburg, N.Y., a corporation of New York
Filed June 8, 1966, Ser. No. 556,058
4 Claims. (Cl. 24—201)

ABSTRACT OF THE DISCLOSURE

A flexible fastener structure having a groove element and a rib element for being interlockably received within the groove element. The rib element has fork-like secondary locking ribs extending rearwardly of the direction of penetration of the rib element into the groove element, and both the secondary locking ribs of the rib element and hook portions of the groove element having undercut surfaces which are interlockable with one another for preventing the separation of the elements in response to a separating force applied in the normal direction of pull between the rib and groove elements.

---

This invention relates to a flexible fastener structure having interlocking rib and groove elements and in particular relates to a fastener structure having subsidiary locking ribs for further binding the elements together when an opening or unlocking force is applied which would normally tend to separate the elements.

Flexible reclosable fastener structures have become widely accepted as being economical and otherwise desirable substitutes for a variety of fastener elements heretofore common in the art. For instance, flexible fasteners are now adaptable for being used in jointing plastic tubing together, in connection with the packaging of cosmetics, in providing closure structures for satchels, briefcases and the like, for closing and sealing office-type envelopes and other packages, for joining large sections of plastic sheeting together, and for a plurality of reclosable adaptations. The list of potential uses for the flexible reclosable fastener is an expanding one, and, accordingly, new flexible fastener structures must be developed to meet the specific requirements of both present and future applications of flexible fasteners.

Flexible fastener structures operate generally on the principle that interlockable rib and groove elements when formed of a suitable flexibility can be caused to deform for the purpose of becoming engaged, and when once engaged will maintain a locked position until a specially directed force causes the elements to disengage. Essentially, a flexible fastener comprises a flexible rib element which has an overhanging lip, edge or the like which may be deformed as it penetrates the groove element and which then snaps into a non-deformed or non-stressed condition for rigidly grasping a similar edge of the groove element. Once the rib and groove elements are engaged, it is the function of the flexible fastener to resist the normal disengagement forces associated with the container being sealed or closed by the elements. However, when the elements are rotated in a predetermined manner, or when a specially constructed slider is moved along the length of the elements, the fastener will be easily separated. Nevertheless, since the rib and groove elements are necessarily formed of a flexible deformable type material, a sufficient force will tend to separate the elements despite the fact that the force is not applied by a special slider or in a rotatable or specialized direction. Accordingly, it has been found that in circumstances requiring appreciable binding forces, flexible fasteners heretofore known have not been able to meet the force retaining requirements.

Various structures have been designed for the purpose of increasing the loading capable of being sustained by flexible fasteners. For instance, flexible fasteners have been developed having a plurality of rib and groove elements for the purpose of increasing the closure grip. Also, flexible fasteners have been formed having various contoured surfaces including curlicued hook elements and the like. However, all such elements of heretofore developed fasteners have not been entirely satisfactory in that resisting appreciable opening forces has continued to be a major obstacle to a variety of applications for the flexible fastener.

Accordingly, it is a principal object of this invention to provide a flexible fastener having improved means for resisting opening forces regardless of the plane or direction in which those forces are applied.

It is another object of this invention to provide a flexible reclosable fastener having means for increasing the binding force of the fastener in response to a spreading of the fastening elements by any means other than the specifically provided opening means.

It is another object of this invention to provide a flexible fastener having interlocking rib and groove elements wherein both the rib and groove elements are provided with undercut subsidiary locking ribs which mesh to increase the binding force of the elements when forces are applied thereto which would normally be expected to separate a flexible fastener.

It is a further object of this invention to provide interlocking rib and groove elements for a flexible fastener wherein both the rib and groove elements have subsidiary locking ribs for increasing the binding force of the elements upon the application of an opening force wherein the subsidiary locking ribs have substantially plane surfaces formed substantially perpendicular to the normal opening force associated with the flexible fastener.

It is an additional object of this invention to provide a flexible fastener having interlocking rib and groove elements and subsidiary locking ribs as described above wherein such locking ribs are provided with substantially sharp longitudinal corners for resisting rotational or twisting forces which may be applied to the flexible fastener and which would otherwise tend to separate the interlocked rib and groove elements.

These and other objects, features and advantages of the present invention will be understood in greater detail from the following description and the associated drawings wherein reference numerals are utilized in designating an illustrative embodiment and wherein:

FIGURE 1 is an elevational view of a flexible fastener according to this invention showing the rib and groove elements in an interlocked state, and FIGURE 2 is a sectional view of the flexible fastener as taken along the lines II—II of FIGURE 1 showing the specific structural aspects of this invention which increase the binding characteristics of the flexible fastener, FIGURE 3 is a sectional view of the structure of the present invention under stressed conditions.

The flexible fastener of this invention utilizes a rib and groove element having specialized subsidiary locking ribs which are orientated with respect to one another in such a form as to increase the binding force between the elements in response to a force which would normally tend to spread or separate the fastener. For instance, the amount of contents of a satchel or briefcase or the like would tend to spread a flexible fastener used to close the satchel and eventually tend to open the fastener. However, the interlocking rib and groove elements of this invention are designed in such a manner that a spreading force decreases the possibility that the contents of the container will inadvertently be opened, up to the time that the spreading forces cause complete distortion of the fastener material.

Accordingly, the flexible fastener of this invention incorporates all of the advantages associated with more rigid closure structures while maintaining the cost and sealing qualities of the flexible fastener.

The flexible fastener of this invention has several features which cooperate to provide the binding effect which increases the locking ability of the elements. In particular, both the rib and groove elements have undercut mating subsidiary ribs which tend to redirect the opening force applied to the elements in such a manner as to create the described binding effect. Also, both the rib and groove elements have plane locking surfaces which are specifically orientated to resist opening forces. In addition, the subsidary locking ribs associated with the rib and groove elements of this invention have comparatively sharp well-defined longitudinal corners which develop a high resistance to rotational twisting or other forces which would otherwise tend to deform and separate the closure elements. Furthermore, the general overall design of the rib and groove element structures is such that the groove element is more completely interwoven with the rib element such that the inadvertent opening of the flexible fastener has been significantly improved.

Referring to the drawing in greater detail, the flexible fastener of this invention comprises generally a groove element 10 and a rib element 11 which may be interlocked in such a manner as to increase the binding force between the elements when forces apparently directed to open the elements are applied thereto. The groove element 10 is formed integrally with a flexible strip 12, and the rib element 11 is similarly formed integrally with a flexible strip 13. The strips 12 and 13 may be the side walls of a container, satchel or the like, or the strips 12 and 13 may simply be marginal strips which are adapted to be heat sealed, or otherwise attached to a variety of containers, packages or other structures requiring a reclosable fastener.

The groove element 10 has a substantially rectangular or cup-like profile which is attached to the flexible strip 12 as at the point 14. The cup-like groove profile comprises rear walls 15 and 16 and side walls 17 and 18. The walls 15, 16, 17 and 18 define a central channel 19 which is adaptable for receiving the principal structure of the rib element 11.

In order to firmly secure the rib element 11 within the central channel 19, the groove element 10 is provided with hook arms 21 and 20 which are formed integrally with the side walls 17 and 18 and which are caused to overlie the central channel 19. It is to be noted that the hook arms 21 and 20 of the groove element 10 are formed substantially perpendicular to the side walls 17 and 18 and are also formed substantially perpendicular to the normal plane of the flexible strips 12 and 13. Since a normal opening or spreading force applied to the flexible fastener would be applied through the flexible strips 12 and 13, the hook arms 20 and 21 are properly orientated for offering maximum resistance to such an opening force.

In addition to the use of the hook arms 20 and 21 to resist opening forces applied to the flexible strips 12 and 13, the groove element 10 has secondary locking ribs 22 and 23 which depend from the hook arms 20 and 21 at points 24 and 25 into the interior of the central channel 19. The secondary locking ribs 22 and 23 are important to the binding effect produced by the rib and groove elements of this invention and will be further described in conjunction with a description of cooperable surfaces of the rib element 11. It suffices here to note that the secondary locking ribs 22 and 23 have outer surfaces 26 and 27 which depend into the central channel 19 and which are spaced as at 28 to allow the entry of a rib element 11 into the cooperable groove element 10.

The rib element 11 comprises a forward or head portion 29 which is secured as at a point 30 to the flexible strip 13. As shown in FIGURE 2, the flexible strip 13 may be substantially reduced in thickness as at a point 31 and which, therefore, allows the space 28 between the primary locking ribs 22 and 23 to be decreased.

The rib element 11 has rearwardly extending fork-like secondary locking ribs 32 and 33 which are cooperable with the secondary locking ribs 22 and 23 of the groove element 11 for binding the elements together in response to an opening or separating force. The fork-like locking ribs 32 and 33 extend rearwardly from the head portion 29 of the rib element 11 and have plane undercut surfaces 34 and 35 which are orientated substantially perpendicular to the plane of the flexible strips 12 and 13. When the rib and groove elements are interlocked as shown in FIGURE 2, the plane surfaces 34 and 35 abut the similar surfaces 36 and 37 of the hook arms 20 and 21 associated with the groove element 10.

The fork-like or secondary locking ribs 32 and 33 are spaced from the flexible strip 13 to form locking grooves which in FIGURE 2 are occupied by the secondary locking ribs 22 and 23 of the groove element 10. Similarly, the secondary locking ribs 22 and 23 are spaced from the side walls 17 and 18 of the groove element 10 to form locking grooves which are in FIGURE 2 occupied by the primary locking ribs 32 and 33. In this manner, the rib and groove elements are intermeshed and, accordingly, resist opening forces applied to the flexible strips 12 and 13.

The secondary locking rib 32 of the rib element 11 has a surface 38 which is mated with a surface 39 of the secondary locking rib 22. Also, the secondary locking rib 22 has a substantially plane undercut surface 40 which abuts a similar surface 41 associated with the rib element 11. Similarly, the primary locking rib 33 has a surface 42 which mates with a surface 43 of the secondary locking rib 23. Also, the secondary locking rib 23 has an undercut surface 44 which mates with a similar surface 45 associated with the rib element 11. Accordingly, when opening forces 46 and 47 are applied to the flexible strips 12 and 13, the side walls 17 and 18 of the groove element 12 tend to be forced open and to be pried apart. This motion, however, causes the secondary locking ribs 22 and 23 of the groove element to lock into the secondary locking ribs 32 and 33 of the rib element more tightly, thereby binding the rib and groove element together more firmly as shown in FIGURE 3. When you stress an ordinary shaped arrow fastener which has no secondary locking ribs, the jaws of the female or groove profile tends to separate outwardly. At the same time, the ends of the arrow are being bent, and when the right point is reached the fastener separates. In the present invention, however, as the groove profile 54 tends to open under stress, the secondary locking rib grips 55 of the groove 56 are forced against the secondary locking ribs 57 of the main rib 58, thereby increasing the locking action. This increase in locking force is indicated by the arrow 59 in FIGURE 3.

In addition to the binding effect provided by the secondary locking ribs of the rib and groove elements and by the associated undercut mating surfaces as well as by the plane perpendicular surfaces of both the rib and groove elements, the secondary locking ribs, namely the ribs 22, 23, 32, and 33, are provided with substantially sharp or well-defined corners 48, 49, 50, and 51, for example, which resist the spreading or unlocking of the rib and groove elements. In particular, as the contents of a satchel, container or the like is increased or becomes excessive, the flexible strips 12 and 13 become pulled or drawn in such a manner as to rotate the rib and groove elements relative to one another. It is apparent that such a rotary motion which would otherwise tend to unlock the rib and groove elements, is resisted by the undercut surfaces of the secondary locking ribs of the rib and groove elements. However, the well-defined corners 48 through 51 of the respective locking ribs also tend to resist the rotary and other opening forces which may be applied to the flexible strips 12 and 13, thereby providing a more effective and consequently a more desirable flexible fastener.

It will be apparent that various modifications and combinations of the features of this invention may be accomplished by those versed in the art, but I desire to claim all such modifications and combinations as properly come within the scope and spirit of my invention.

I claim as my invention:

1. An interlocking flexible fastener comprising:
   a pair of flexible strips extending longitudinally toward each other,
   a groove element formed integrally with one of said flexible strips and a rib element formed integrally with the opposing strip,
   said rib and groove elements being interlockable and separable,
   said rib element being attached to its associated flexible strip substantially at the longitudinal center thereof and having a main rib with fork-like secondary locking ribs extending rearwardly of the direction of penetration of the rib element into the groove element,
   said secondary locking ribs having substantially plane surfaces forming the extremity thereof,
   said groove element having hook portions for firmly engaging the plane surfaces of the secondary locking ribs,
   said secondary locking grooves being formed between each of the secondary locking ribs of the rib portion and the adjacent surfaces of the flexible strip wherein said hook portions of the groove element extend around the locking ribs and into said secondary locking grooves,
   said secondary locking ribs of the rib element being spaced from the flexible strip, and
   the secondary locking ribs having undercut surfaces being formed substantially perpendicular to the normal direction of penetration of the rib element into the groove element.

2. An interlocking flexible fastener in accordance with claim 1 wherein the hook portions of the groove element have undercut surfaces formed substantially perpendicular to the direction of penetration into the rib element into the groove element, and wherein the secondary locking ribs are received beneath the undercut surface of the groove element, and wherein the hook portions of the groove element are received beneath the undercut surface of the secondary locking ribs.

3. An interlocking fastener in accordance with claim 2 wherein the extremities of said secondary locking ribs of the rib and groove elements have sharply defined longitudinal corners for binding the elements together when an opening force is applied to the attached flexible strips.

4. A flexible fastener comprising:
   longitudinally facing rib and groove elements,
   said rib and groove elements being interlockable and separable,
   said groove element having cup-like walls forming a central channel for holding the rib element therein,
   said cup-like walls having hook arms extending from the extremities thereof toward each other and overlying the central channel,
   said hook arms having secondary locking ribs depending therefrom toward the interior of said channel and forming longitudinal grooves between the secondary ribs and said cup-like walls,
   said rib element having a head portion and rearwardly extending fork-like secondary locking ribs,
   a flexible strip integrally joined to said head portion and intermediate said fork-like ribs and forming thereby further longitudinal grooves with the fork-like ribs,
   said fork-like secondary locking ribs of the rib element being engageable within said longitudinal grooves and said secondary locking ribs of the groove element being engageable within said further longitudinal grooves,
   said secondary locking ribs of the rib and groove element having undercut surfaces formed substantially perpendicular to the normal direction of penetration of the rib element into the groove element thereby providing a resistance to the separation of the rib and groove elements by forces normally applied therebetween.

References Cited

UNITED STATES PATENTS 2,810,944 10/1957 Sander.
2,858,591 11/1958 Frey.

FOREIGN PATENTS 541,227 5/1957 Canada.
1,026,620 4/1953 France.

BERNARD A. GELAK, *Primary Examiner.*